United States Patent
Chen et al.

(10) Patent No.: US 8,300,881 B2
(45) Date of Patent: Oct. 30, 2012

(54) METHOD AND SYSTEM FOR WATERMARKING 3D CONTENT

(75) Inventors: Xuemin Chen, Rancho Santa Fe, CA (US); Samir Hulyalkar, Newtown, PA (US); Marcus Kellerman, San Diego, CA (US); Ilya Klebanov, Thornhill (CA)

(73) Assignee: Broadcom Corporation, Irvine, CA (US)

( * ) Notice: Subject to any disclaimer, the term of this patent is extended or adjusted under 35 U.S.C. 154(b) by 557 days.

(21) Appl. No.: 12/560,578

(22) Filed: Sep. 16, 2009

(65) Prior Publication Data
US 2011/0064262 A1 Mar. 17, 2011

(51) Int. Cl.
*G06K 9/00* (2006.01)
(52) U.S. Cl. ........................ 382/100; 382/154
(58) Field of Classification Search .................. 382/100, 382/154
See application file for complete search history.

(56) References Cited

U.S. PATENT DOCUMENTS

| 6,587,944 B2 * | 7/2003 | Yeung et al. ................. 713/176 |
| 7,697,609 B2 * | 4/2010 | Ryou ....................... 375/240.16 |
| 2009/0268816 A1 * | 10/2009 | Pandit et al. ............. 375/240.12 |

* cited by examiner

*Primary Examiner* — Tom Y Lu
(74) *Attorney, Agent, or Firm* — Sterne, Kessler, Goldstein & Fox PLLC

(57) ABSTRACT

A video transmitter identifies regions in pictures in a compressed three-dimensional (3D) video comprising a base view video and an enhancement view video. The identified regions are not referenced by other pictures in the compressed 3D video. The identified regions are watermarked. Pictures such as a high layer picture in the base view video and the enhancement view video are identified for watermarking. The identified regions in the base view and/or enhancement view videos are watermarked and multiplexed into a transport stream for transmission. An intended video receiver extracts the base view video, the enhancement view video and corresponding watermark data from the received transport stream. The corresponding extracted watermark data are synchronized with the extracted base view video and the extracted enhancement view video, respectively, for watermark insertion. The resulting base view and enhancement view videos are decoded into a left view video and a right view video, respectively.

20 Claims, 6 Drawing Sheets

METHOD AND SYSTEM FOR WATERMARKING 3D CONTENT

CROSS-REFERENCE TO RELATED APPLICATIONS/INCORPORATION BY REFERENCE

This application makes reference to:
U.S. Provisional Application Ser. No. 61/287,624, filed Dec. 17, 2009, entitled "Method and System for Enhanced 2D Video Display Based on 3D Video Input";
U.S. Provisional Application Ser. No. 61/287,634, filed Dec. 17, 2009, entitled "Method and System for Sharpness Processing for 3D Video";
United States Non-Provisional Application Ser. No. 12/554, 416, filed Sep. 4, 2009, entitled "Method and System for Processing 2D/3D Video";
United States Non-Provisional Application Ser. No. 12/546, 644, filed Aug. 24, 2009, entitled "Method and System for Converting a 3D Video with Targeted Advertisement into a 2D Video for Display";
United States Non-Provisional Application Ser. No. 12/619, 461, filed Nov. 16, 2009, entitled "Method and System for Adaptive Viewport for a Mobile Device Based on Viewing Angle";
United States Non-Provisional Application Ser. No. 12/578, 048, filed Oct. 13, 2009, "Method and System for Communicating 3D Video Via a Wireless Communication Link";
U.S. Provisional Application Ser. No. 61/287,653, filed Dec. 17, 2009, entitled "Method and System for Generating 3D Output Video with 3D Local Graphics from 3D Input Video";
U.S. Provisional Application Ser. No. 61/242,644, filed Sep. 15, 2009, entitled "Method and System for Rendering 3D Graphics Based on 3D Display Capabilities";
United States Non-Provisional Application Ser. No. 12/545, 679, filed Aug. 21, 2009, entitled "Method and System for Asymmetrical Rate Control for 3D Video Compression";
United States Non-Provisional Application Ser. No. 12/560, 554, filed Sep. 16, 2009, entitled "Method and System for Frame Buffer Compression and Memory Reduction for 3D Video";
United States Non-Provisional Application Ser. No. 12/560, 592, filed Sep. 16, 2009, entitled "Method and System for Protecting 3D Video Content";
United States Non-Provisional Application Ser. No. 12/604, 936, filed Oct. 23, 2009, entitled "Method and System for Noise Reduction for 3D Video Content";
U.S. Provisional Application Ser. No. 61/287,668, filed Dec. 17, 2009, entitled "Method and System for Interlacing 3D Video";
United States Non-Provisional Application Ser. No. 12/573, 746, filed Oct. 5, 2009, entitled "Method and System for 3D Video Decoding Using a Tier System Framework";
United States Non-Provisional Application Ser. No. 12/573, 771, filed Oct. 5, 2009, entitled "Method and System for a Fast Channel Change in 3D Video";
U.S. Provisional Application Ser. No. 61/287,673, filed Dec. 17; 2009, entitled "Method and System for Video Post-Processing Based on 3D Data";
U.S. Provisional Application Ser. No. 61/287,682, filed Dec. 17, 2009, entitled "Method and System for Pulldown Processing for 3D Video";
United States Non-Provisional Application Ser. No. 12/605, 039, filed Oct. 23, 2009, entitled "Method and System for Response Time Compensation for 3D Video Processing";
U.S. Provisional Application Ser. No. 61/287,689, filed Dec. 17, 2009, entitled "Method and System for Synchronizing 3D Glasses with 3D Video Displays"; and
U.S. Provisional Application Ser. No. 61/287,692, filed Dec. 17, 2009, entitled "Method and System for Dynamic Contrast Processing for 3D Video".

Each of the above stated applications is hereby incorporated herein by reference in its entirety.

FIELD OF THE INVENTION

Certain embodiments of the invention relate to video processing. More specifically, certain embodiments of the invention relate to a method and system for watermarking 3D content.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV, a 3D video is often desirable because it is often more realistic to viewers than the 2D counterpart. A 3D video comprises a left view video and a right view video. A 3D video frame may be produced by combining left view video components and right view video components, respectively.

Various video encoding standards, for example, MPEG-1, MPEG-2, MPEG-4, H.263, and H.264/AVC, have been established for encoding digital video sequences in a compressed manner. A frame in a compressed video may be coded in three possible modes: I-picture, P-picture, and B-picture. Compressed video frames may be divided into groups of pictures (GOPs). Each GOP comprises one I-picture, several P-pictures and/or several B-pictures for transmission.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for asymmetrical rate control for 3D video compression, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and/or system for watermarking 3D content. In various embodiments of the invention, a video transmitter is operable to identify one or more regions in one or more pictures in a compressed three-dimensional (3D) video with associated base view video and enhancement view video. The identified regions are not referenced by one or more other pictures in the compressed 3D video. The video transmitter may be operable to watermark the identified regions for transmission. One or more pictures in the base view video and the enhancement view video may be identified, respectively, for watermarking. A picture with low correlation with other pictures in the compressed 3D video may be watermarked with a higher priority such as a high coding layer picture. The video transmitter may be operable to watermark the identified regions in each of the identified one or more pictures in the base view video and/or the enhancement view video, respectively. The video transmitter may be operable to multiplex the resulting watermarked base view and enhancement view videos into a transport stream for transmission to an intended video receiver. The base view video, the enhancement view video and corresponding watermark data may be extracted from the received transport stream. A base view watermark stream and an enhancement view watermark stream may be created, respectively, using the corresponding extracted watermark data, which may be synchronized with the extracted base view video and the extracted enhancement view video, respectively. The intended video receiver may be operable to insert the synchronized base view watermark stream and the synchronized enhancement view watermark stream into the extracted base view video and the extracted enhancement view video, respectively. The resulting base view and enhancement view videos may be decoded into a left view video and a right view video, respectively.

Figure 1:
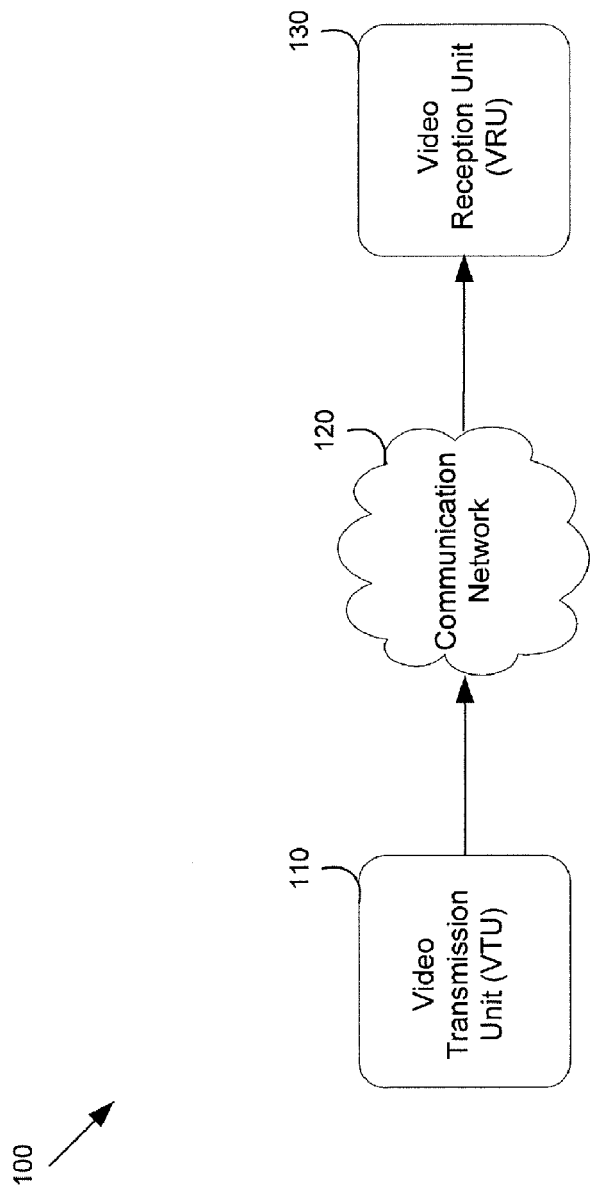
FIG. 1 is a block diagram of an exemplary video coding system that is operable to support 3D content watermarking, in accordance with an embodiment of the invention.

FIG. 1 is a block diagram of an exemplary video coding system that is operable to support 3D content watermarking, in accordance with an embodiment of the invention. Referring to FIG. 1, there is shown a video transmission unit (VTU) 110, a communication network 120 and a video reception unit (VRU) 130.

The VTU 110 may comprise suitable logic, circuitry, interfaces and/or code that may be operable to provide compressed video content to the VRU 130. The VTU 110 may be operable to acquire an uncompressed 3D source video, which comprise a left view video and a right view video. The VTU 110 may be operable to compress the acquired 3D source video into two coding view videos, namely, a base view video and an enhancement view video using, for example, MPEG-4 Multi-view Video Coding (MVC) standard. Pictures in the base view video and the enhancement video may comprise I-pictures, P-pictures and/or B-pictures at different coding layers. Video content in both the base view video and the enhancement view video may be copy-protected via video watermarking. In this regard, the VTU 110 may be operable to watermark pictures in the base view video and the enhancement view video so as to prevent illegal duplication of associated video programs. Watermarks may be embedded into pictures in the base view video and/or the enhancement view video. The VTU 110 may be operable to determine regions for watermarking in the base view and the enhancement view pictures, respectively. The VTU 110 may be operable to identify base view pictures with specific regions that are not referenced by other pictures of the compressed 3D video. The specific regions in the identified base view pictures may be watermarked. Due to the high correlation between the base view and the enhancement view, the VTU 110 may be operable to correlate the enhancement view pictures with the corresponding watermarked base view pictures for watermarking. The VTU 110 may be operable to identify correlated enhancement view pictures with specific regions that are not referenced by other pictures of the compressed 3D video. The VTU 110 may be operable to watermark the specific regions in the identified enhancement view pictures. The embedded watermarks may be carried with a specific picture identity (PID) and may be difficult to remove deliberately or accidentally. The VTU 110 may be operable to multiplex the resulting watermarked base view and enhancement view videos into a single transport stream for transmission.

Although two coding views, namely, a base view and an enhancement view are illustrated for the VTU 110 in FIG. 1 for a MVC 3D video, the invention may not be so limited. Accordingly, identifying watermarking regions in pictures that are not referenced by other pictures of the MVC 3D video is applicable to a video system which uses MVC with more than 2 coding views without departing from the spirit and scope of various embodiments of the invention.

The communication network 120 may comprise suitable logic, circuitry, interfaces and/or code that may be operable to provide platforms for communication between the VTU 110 and the VRU 130. The communication network 120 may be implemented as a wired or wireless communication network. The communication network 120 may be local area network, wide area network, the Internet, and the like.

The VRU 130 may comprise suitable logic, circuitry, interfaces and/or code that may be operable to receive a transport stream from the VTU 110 over the communication network 120. The received transport stream may comprise watermarked base view and enhancement view videos of a compressed 3D video. In this regard, the VRU 130 may be operable to extract the base view video and the enhancement view video from the received transport stream. The VRU 130 may be operable to extract or verify watermarks embedded in the received transport stream. The VRU 130 may be operable to synchronize the extracted watermarks to splice points in the extracted base view video and/or the extracted enhancement view video for watermarking. The extracted or verified watermarks may be inserted into pictures in the extracted base view and the enhancement view videos of the compressed 3D video. In this regard, the extracted watermarks may be replaced by inserting a different watermark into the pictures in the extracted base view and the enhancement view videos of the compressed 3D video. The VRU 130 may be operable to decompress or decode the watermarked base view pictures and/or the watermarked enhancement view pictures into a left view video and a right view video for a 3D display. Examples of the VRU 130 may comprise set-top boxes, personal computers, and the like.

In an exemplary operation, the VTU 110 may be operable to acquire an uncompressed 3D video comprising a left view video and a right view video. The VTU 110 may be operable to use MPEG-4 MVC standard to compress the acquired uncompressed 3D video into a base view video and an enhancement view video each comprising a plurality of compressed pictures. Pictures in the base view video and the enhancement view video may be watermarked for copy-protection. Base view pictures with specific regions that are not referenced by other pictures in the extracted base view and enhancement view videos may be identified for watermarking. The VTU 110 may be operable to insert or embed watermarks into the specific regions of the identified base view pictures. Enhancement view pictures may be correlated with the corresponding watermarked base view pictures. Correlated enhancement view pictures with specific regions that are not referenced by other pictures in the extracted base view and enhancement view videos may be identified for watermarking. The VTU 110 may be operable to insert or embed the watermarks into the specific regions of the identified enhancement view pictures. The watermarked base view video and enhancement view video may be multiplexed into a single transport stream for transmission. The transport stream may be communicated with the VRU 130 via the communication network 120. The VRU 130 may be operable to extract the base view video and the enhancement view video from the received transport stream for video decoding. The VRU 130 may be operable to extract watermarks embedded in the received transport stream. The extracted watermarks may be synchronized to splice points in the extracted base view video and/or the extracted enhancement view video for watermarking. The extracted watermarks or corresponding replacements may be inserted into pictures in the extracted base view and the enhancement view videos of the compressed 3D video. The watermarked base view pictures and/or the watermarked enhancement view pictures may be decompressed or decoded into a left view video and a right view video for a 3D display.

Figure 2:
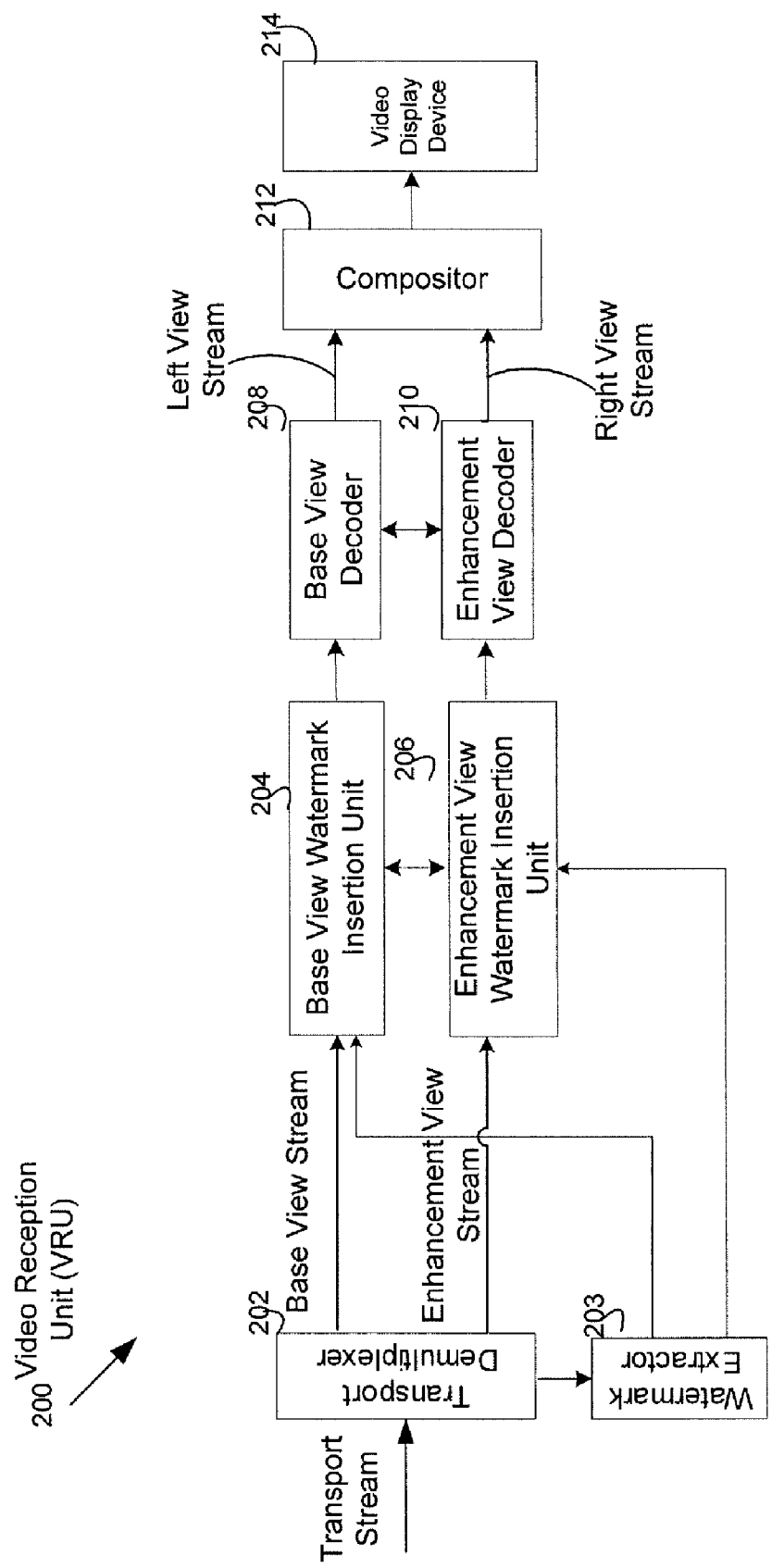
FIG. 2 is a diagram illustrating an exemplary video reception unit that is operable to watermark 3D content, in accordance with an embodiment of the invention.

FIG. 2 is a diagram illustrating an exemplary video reception unit that is operable to watermark 3D content, in accordance with an embodiment of the invention. Referring to FIG. 2, there is shown a video reception unit (VRU) 200. The VRU 200 comprises a transport demultiplexer 202, a watermark extractor 203, a base view watermark insertion unit 204, an enhancement view watermark insertion unit 206, a base view decoder 208, an enhancement view decoder 210, a compositor 212 and a video display device 214.

The transport demultiplexer 202 may comprise suitable logic, circuitry, interfaces and/or code that may be operable to demultiplex or parse a transport stream received from the VTU 110, for example. The received transport stream may comprise watermarked base view and enhancement view videos of a compressed 3D video. The transport demultiplexer 202 may be operable to extract the base view video and the enhancement view video from the received transport stream. The transport demultiplexer 202 may be operable to communicate the extracted base view and the enhancement view videos to the base view watermark insertion unit (BVWIU) 204 and the enhancement view watermark insertion unit (EVWIU) 206, respectively, for watermarking. The transport demultiplexer 202 may also be operable to communicate with the watermark extractor 203 to extract and/or verify watermarks embedded in the received transport stream.

The watermark extractor 203 may comprise suitable logic, circuitry, interfaces and/or code that may be operable to extract watermarks embedded in the received transport stream. The extracted watermarks may be communicated to the BVWIU 204 and the EVWIU 206 to watermark pictures in the base view video and the enhancement view video, respectively.

The BVWIU 204 and the EVWIU 206 may comprise suitable logic, circuitry, interfaces and/or code that may be operable to perform watermarking in compressed video domain. The BVWIU 204 and the EVWIU 206 may be operable to insert or splice watermarks extracted by the watermark extractor 203 into corresponding pictures in the extracted base view and enhancement view videos, respectively. In this regard, the BVWIU 204 may be operable to extract watermark data from the received transport stream to create a base view watermark stream. The created base view watermark stream may be synchronized with the extracted base view video. The created base view watermark stream may be inserted into the extracted base view video. Both slice-based and/or frame-based watermarking may be supported by the BVWIU 204. Information such as location information of watermarking regions in the watermarked base view pictures may be communicated with the EVWIU 206 to be used for watermarking enhancement view pictures.

The EVWIU 206 may be operable to correlate enhancement view pictures with the watermarked base view pictures. The EVWIU 206 may be operable to extract watermark data from the received transport stream to create an enhancement view watermark stream. The created enhancement view watermark stream may be synchronized with the extracted enhancement view video. The created enhancement view watermark stream may be inserted into the extracted enhancement view video. Both slice-based and/or frame-based watermarking may be supported by the EVWIU 206. The resulting watermarked base view and enhancement view pictures may be communicated with the base view decoder 208 and the enhancement view decoder 210, respectively, for video decoding.

The base view decoder 208 may comprise suitable logic, circuitry, interfaces and/or code that may be operable to decode watermarked base view pictures from the BVWIU 204 into, for example, pictures in a left view video of the uncompressed 3D video. The base view decoder 208 may be operable to utilize various video decompression algorithms such as specified in MPEG-4, AVC, VC1, VP6 and/or other video formats to form decompressed or decoded video contents in the left view video of the uncompressed 3D video. Information such as the scene information from base view decoding may be communicated to the enhancement view decoder 210 and utilized for enhancement view decoding.

The enhancement view decoder 210 may comprise suitable logic, circuitry, interfaces and/or code that may be operable to decode watermarked enhancement view pictures from the EVWIU 206 into, for example, pictures in a right view video of the uncompressed 3D video. The enhancement view decoder 210 may be operable to utilize various video decompression algorithms such as specified in MPEG-4, AVC, VC1, VP6 and/or other video formats to form decompressed or decoded video contents in the right view video of the 3D video. The resulting left view and right view videos may be communicated with the compositor 212 to produce copy-protected 3D pictures for display.

The compositor 212 may comprise suitable logic, circuitry, interfaces and/or code that may be operable to combine watermarked pictures in the left view and right view videos into 3D pictures for display. The compositor 212 may be operable to present the 3D pictures to a user via the video display device 214.

The video display device 214 may comprise suitable logic, circuitry, and/or code that may be operable to display 3D video pictures received from the compositor 212.

In operation, the transport demultiplexer 202 may be operable to receive a transport stream from the VTU 110, for example. The received transport stream comprises watermarked base view and enhancement view videos of a compressed 3D video. The base view video and the enhancement view video may be extracted from the received transport stream. Watermark data embedded in the received transport stream may be extracted via the watermark extractor 203. The watermark extractor 203 may be operable to create a base view watermark stream and an enhancement view watermark stream using the extracted watermark data to be synchronized with the extracted base view stream and the extracted enhancement view stream, respectively. The synchronized base view and enhancement view watermark streams may be inserted or spliced into the extracted base view video and the extracted enhancement view video, respectively, via the BVWIU 204 and the EVWIU 206. The base view decoder 208 and the enhancement view decoder 210 may be operable to decompress the resulting watermarked base view video and enhancement view video, respectively, into a left view video and a right view video of an associated uncompressed 3D video. The left view video and the right view video may be combined via the compositor 212 to be displayed on the video display device 214.

Figure 3:
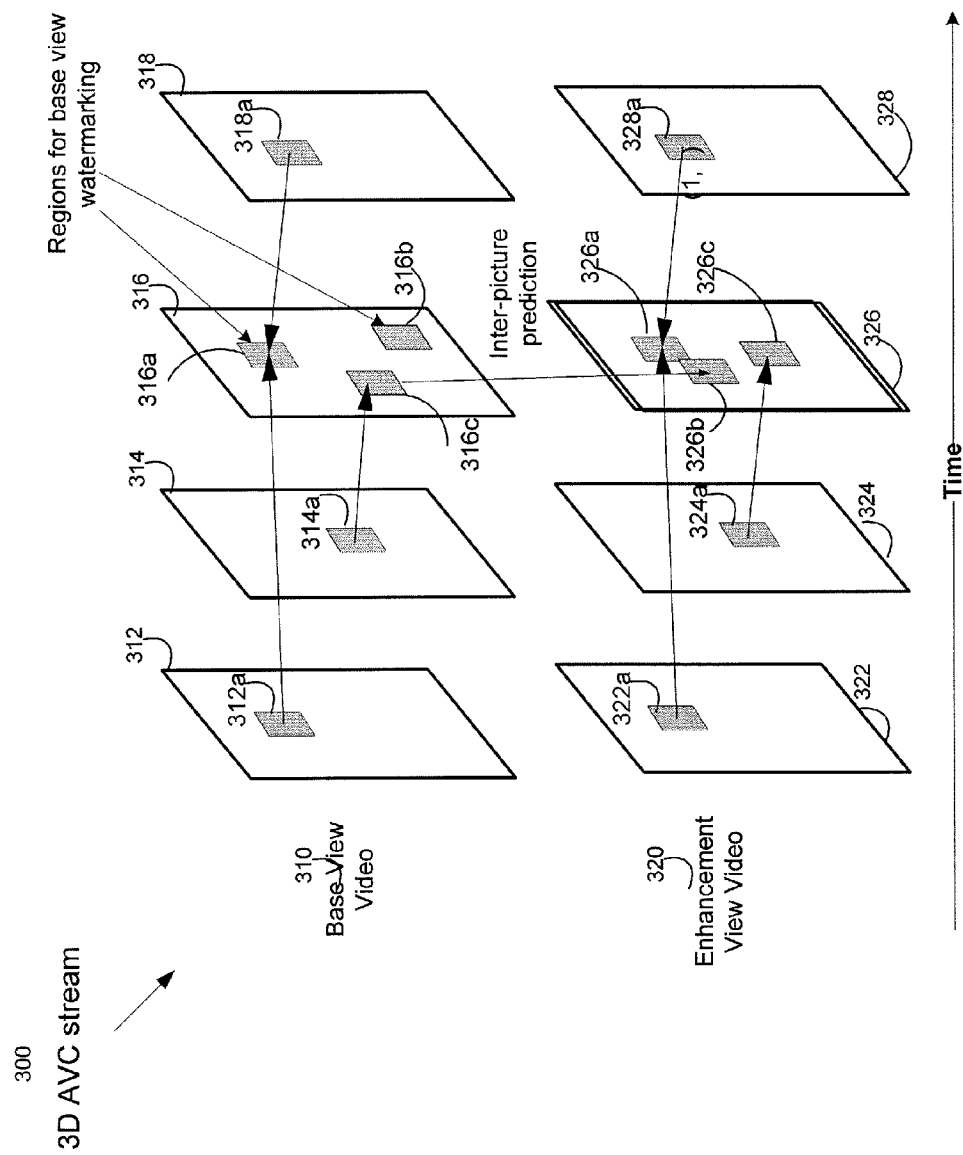
FIG. 3 is a diagram illustrating an exemplary independently decodable 3D AVC stream that is watermarked, in accordance with an embodiment of the invention.

FIG. 3 is a diagram illustrating an exemplary independently decodable 3D AVC stream that is watermarked, in accordance with an embodiment of the invention. Referring to FIG. 3, there is shown a 3D AVC stream 300. The 3D AVC stream 300 comprises a base view video 310 and an enhancement view video 320, which are generated or produced using MPEG-4 MVC standard via the base view encoder 212 and the enhancement view encoder 214, respectively. The base view video 310 comprises a plurality of pictures, of which, pictures 312-318 are illustrated. The enhancement view video 320 comprises a plurality of pictures, of which, pictures 322-328 are illustrated. Pictures in both base view video 310 and the enhancement view video 320 may be watermarked for copy-protection, for example. In this regard, regions in a picture may be watermarked via the VTU 110 if the regions are not referenced by other pictures in the 3D AVC stream 300. For example, regions such as a region 312*a* in the base view picture 312 and a region 318*a* in the base view picture 318 may be used as references to perform intra-view picture prediction on a region 316*a* in the base view picture 316. The region 312*a* and the region 318*a* may not be watermarked. Regions such as a region 316*c* in the base view picture 316 may not used as a reference to other pictures in the same vide video, however, the region 316*c* in the base view picture 316 may be used as a reference to perform inter-view picture prediction on a region 326*b* in the enhancement view picture 326. The region 316*c* may not be watermarked. Regions such as a region 316*a*, a region 316*b*, a region 326*a* and a region 326*b* are not referenced by other pictures in the 3D AVC stream 300, and may be watermarked.

Figure 4:
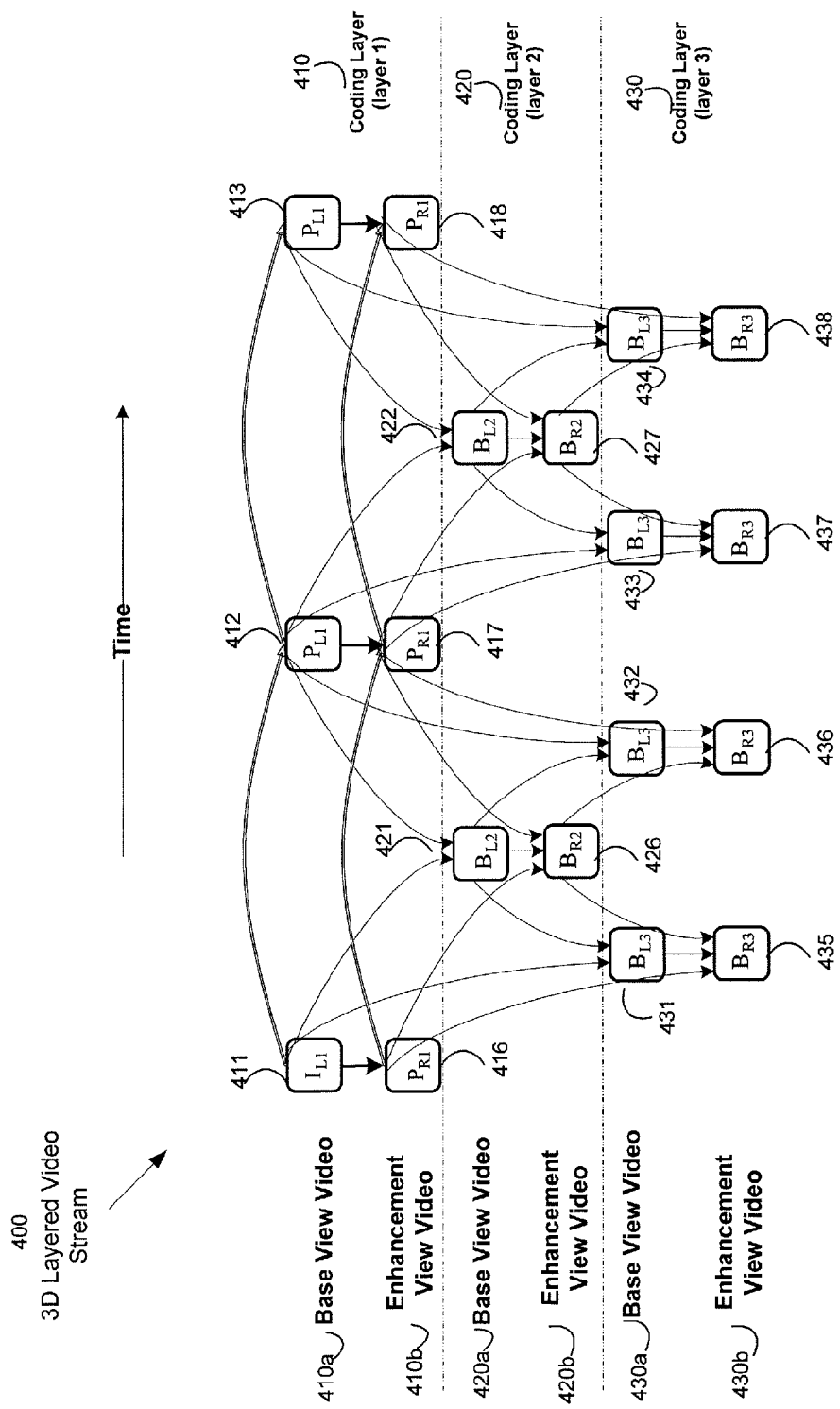
FIG. 4 is a diagram illustrating exemplary a 3D layered video stream that is watermarked, in accordance with an embodiment of the invention.

FIG. 4 is a diagram illustrating exemplary a 3D layered video stream that is watermarked, in accordance with an embodiment of the invention. Referring to FIG. 4, there is shown a 3D layered stream 400. The 3D layered stream 400 comprises coding layers 410-430, which correspond to the base layer (layer 1), the middle layer (layer 2) and the high layer (layer 3), respectively, of the 3D layered stream 400. Two coding views are generated or produced in each coding layer. For example, a base view video stream 410*a* and an enhancement view video stream 410*b* are generated in the coding layer 410. The 3D layered stream 400 comprises a plurality of layered pictures, of which pictures 411-418, 421-427, and 431-438 are illustrated. Due to a high correlation between the base view and enhancement view videos over the coding layers, pictures in an enhancement view video such as the enhancement view video stream 420*b* may be correlated to pictures in the base view video stream 420*a*. Pictures in enhancement view are not referenced by other pictures in the 3D layered stream 400 may be watermarked. For example, in the enhancement view, pictures such as the pictures 416-418 and 426-427 are referenced to predict the pictures 435, 436 and 437, respectively. The pictures 416-418 and 426-427 may not be watermarked. However, pictures such as the picture 435, 436 and 437 in the enhancement view video 430 may not be referenced by other pictures in the 3D layered stream 400 and may be watermarked.

Figure 5:
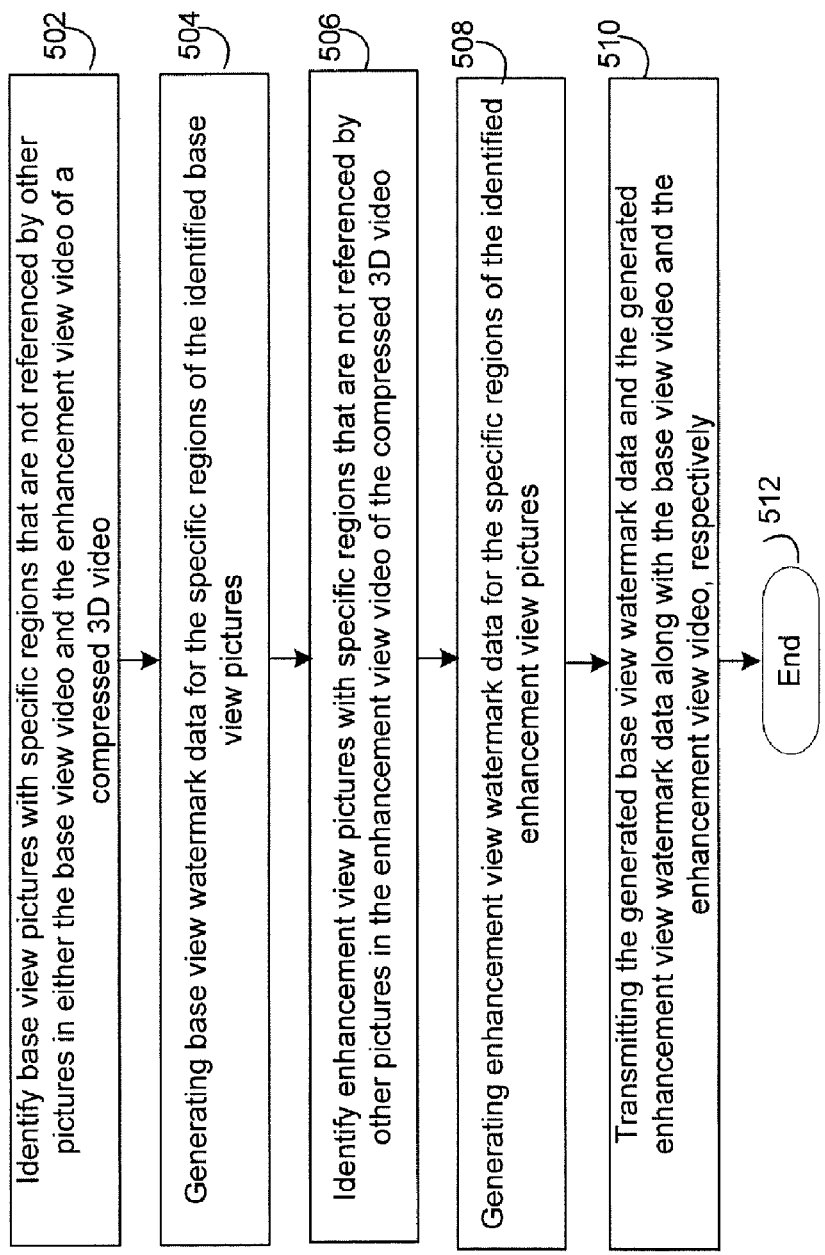
FIG. 5 is a flow chart illustrating exemplary steps that are utilized to watermark 3D content for transmission, in accordance with an embodiment of the invention.

FIG. 5 is a flow chart illustrating exemplary steps that are utilized to watermark 3D content for transmission, in accordance with an embodiment of the invention. Referring to FIG. 5, the exemplary steps start with step 502, where the VTU 110 may be operable to identify base view pictures such as the base view picture 316 with specific regions such as the region 316*c* that are not referenced by other pictures in either the base view video and the enhancement view video of a compressed 3D video. In step 504, the VTU 110 may be operable to generating base view watermark data for the specific regions of the identified base view pictures. In step 506, the VTU 110 may be operable to identify enhancement view pictures such as the enhancement view picture 326 with specific regions such as the region 326*c* that are not referenced by other pictures in the enhancement view video of the compressed 3D video. In step 508, the VTU 110 may be operable to generating enhancement view watermark data for the specific regions of the identified enhancement view pictures. In step 508, the VTU 110 may be operable to transmit the generated base view watermark data and the generated enhancement view watermark data along with the base view video and the enhancement view video, respectively.

Figure 6:
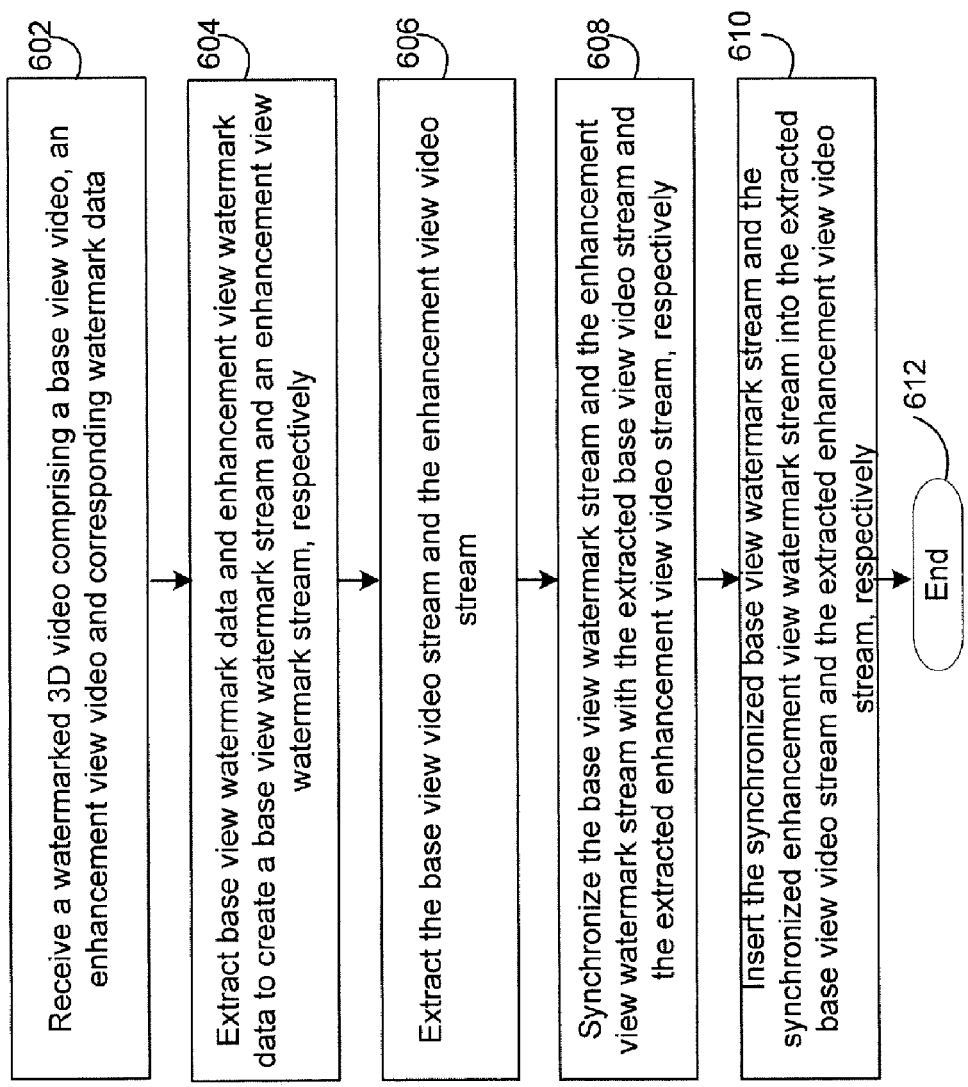
FIG. 6 is a flow chart illustrating exemplary steps that are utilized to watermark received 3D content, in accordance with an embodiment of the invention.

FIG. 6 is a flow chart illustrating exemplary steps that are utilized to watermark received 3D content, in accordance with an embodiment of the invention. Referring to FIG. 5, the exemplary steps start with step 502, where the transport demultiplexer 202 of the video reception unit (VRU) 200 may be operable to receive a watermarked 3D video. The received watermarked 3D video may comprise a base view video, an enhancement view video and corresponding watermark data. In step 504, the watermark extractor 203 may be operable to extract base view watermark data and enhancement view watermark data, respectively, to create a base view watermark stream and an enhancement view watermark stream for watermarking. In step 506, the watermark extractor 203 may be operable to extract the base view video and the enhancement view video from the received watermarked 3D video. In step 508, the watermark extractor 203 may be operable to synchronize the created base view watermark stream and the created enhancement view watermark stream with the extracted base view video stream and the extracted enhancement view video stream, respectively. In step 510, the synchronized base view watermark stream and the synchronized enhancement view watermark stream may be inserted into the extracted base view video stream and the extracted enhancement view video stream, respectively.

Aspects of a method and system for watermarking 3D content are provided. In accordance with various embodiments of the invention, the VTU 110 may be operable to identifying one or more regions in one or more pictures in a compressed three-dimensional (3D) video. The compressed 3D video comprises a base view video and an enhancement view video. The identified one or more regions such as the region 316c and the region 326c are not referenced by one or more other pictures in the compressed 3D video. The VTU 110 may be operable to watermark the identified one or more regions. One or more pictures in the base view video and the enhancement view video may be identified, respectively, for watermarking. A picture with low correlation with other pictures in the compressed 3D video may be watermarked. For example, the identified one or more pictures in the enhancement view video may be associated with a highest coding layer.

The VTU 110 may be operable to watermark the identified one or more regions in each of said identified one or more pictures in the base view video and/or the enhancement view video, respectively. The VTU 110 may be operable to multiplex the resulting watermarked base view and enhancement view videos into a transport stream for transmission. The VRU 120 may be operable to extract the base view video, the enhancement view video and corresponding watermark data from the received transport stream. The watermark extractor 203 may be operable to create a base view watermark stream and an enhancement view watermark stream, respectively, using the corresponding extracted watermark data. The created base view watermark stream and the created enhancement view watermark stream may be synchronized with the extracted base view video and the extracted enhancement view video, respectively. The BVWIU 204 and the WVWIU 206 may be operable to insert the synchronized base view watermark stream and the synchronized enhancement view watermark stream into the extracted base view video and the extracted enhancement view video, respectively. The resulting base view and enhancement view videos may be decoded into a left view video and a right view video via the base view decoder 208 and the enhancement view decoder 210, respectively.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for watermarking 3D content.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video coding, the method comprising:
performing by one or more processors and/or circuits for use in a video processing system:
identifying one or more regions in one or more pictures in a compressed three-dimensional (3D) video comprising a base view video and an enhancement view video, wherein said identified one or more regions are not referenced by one or more other pictures in said 3D compressed video; and
watermarking said identified one or more regions.

2. The method according to claim 1, comprising identifying one or more pictures in said base view video and said enhancement view video, respectively, which are not referenced by one or more other pictures.

3. The method according to claim 2, wherein said identified one or more pictures in said enhancement view video are associated with a highest coding layer.

4. The method according to claim 2, comprising watermarking said one or more regions in each of said identified one or more pictures in said base view video and/or said enhancement view video, respectively.

5. The method according to claim 4, comprising multiplexing said watermarked base view video and said watermarked enhancement view video into a transport stream for transmission.

6. The method according to claim 5, wherein said base view video, said enhancement view video and corresponding watermark data are extracted from said transport stream.

7. The method according to claim 6, wherein said corresponding extracted, watermark data is used to create a base view watermark stream and an enhancement view watermark stream, respectively.

8. The method according to claim 7, wherein said created base view watermark stream and said created enhancement view watermark stream are synchronized with said extracted base view video and said extracted enhancement view video, respectively.

9. The method according to claim 8, wherein said synchronized base view watermark stream and said synchronized enhancement view watermark stream are inserted into said extracted base view video and said extracted enhancement view video, respectively.

10. The method according to claim 9, wherein said base view video with said inserted base view watermark stream and said enhancement view video with said inserted enhancement view watermark stream are decompressed into a left view video and a right view video.

11. A system for video coding, the system comprising:
one or more processors and/or circuits for use a video processing system, wherein said one or more processors and/or circuits are operable to:

identify one or more regions in one or more pictures in a compressed three-dimensional (3D) video comprising a base view video and an enhancement view video, wherein said identified one or more regions are not referenced by one or more other pictures in said 3D compressed video; and watermark said identified one or more regions.

12. The system according to claim 11, comprising identifying one or more pictures in said base view video and said enhancement view video, respectively, which are not referenced by one or more other pictures.

13. The system according to claim 12, wherein said identified one or more pictures in said enhancement view video are associated with a highest coding layer.

14. The system according to claim 12, wherein said one or more processors and/or circuits are operable to watermark said one or more regions in each of said identified one or more pictures in said base view video and/or said enhancement view video, respectively.

15. The system according to claim 14, wherein said one or more processors and/or circuits are operable to multiplex said watermarked base view video and said watermarked enhancement view video into a transport stream for transmission.

16. The system according to claim 15, wherein said base view video, said enhancement view video and corresponding watermark data are extracted from said transport stream.

17. The system according to claim 16, wherein said corresponding extracted watermark data is used to create a base view watermark stream and an enhancement view watermark stream, respectively.

18. The system according to claim 17, wherein said created base view watermark stream and said created enhancement view watermark stream are synchronized with said extracted base view video and said extracted enhancement view video, respectively.

19. The system according to claim 18, wherein said synchronized base view watermark stream and said synchronized enhancement view watermark stream are inserted into said extracted base view video and said extracted enhancement view video, respectively.

20. The system according to claim 19, wherein said base view video with said inserted base view watermark stream and said enhancement view video with said inserted enhancement view watermark stream are decompressed into a left view video and a right view video.

* * * * *

UNITED STATES PATENT AND TRADEMARK OFFICE
CERTIFICATE OF CORRECTION

PATENT NO. : 8,300,881 B2  Page 1 of 1
APPLICATION NO. : 12/560578
DATED : October 30, 2012
INVENTOR(S) : Chen et al.

It is certified that error appears in the above-identified patent and that said Letters Patent is hereby corrected as shown below:

Column 10, Line 46, please replace "extracted, watermark" with --extracted watermark--; and Column 10, Line 65, please replace "use a" with --use in a--.

Signed and Sealed this
Twenty-second Day of January, 2013

David J. Kappos
*Director of the United States Patent and Trademark Office*